United States Patent Office 3,326,968
Patented June 20, 1967

3,326,968
PROCESS FOR PRODUCING 2-HYDROXY ALKYL-CARBAMIC ACID ESTERS
Leonard Levine and George E. Ham, Lake Jackson, Tex., assignors to The Dow Chemical Company, Midland, Mich., a corporation of Delaware
No Drawing. Filed Dec. 9, 1963, Ser. No. 329,217
6 Claims. (Cl. 260—482)

The invention relates to useful carbamate compositions containing both a carbamate group and a carboxylic acid ester linkage and to the preparation of such compositions.

It is known that benzoic acid will react with ethyl 1-aziridinylcarboxylate after standing at room temperature for about one year as disclosed by Iwakura et al. in the Journal of Organic Chemistry, 26, 4384-8, (1961).

It has now been found that formic acid and lower alkanoic acids react with alkyl 1-aziridinylcarboxylates to produce esters of 2-hydroxyalkylcarbamic acid. The reaction may be represented by the following equation

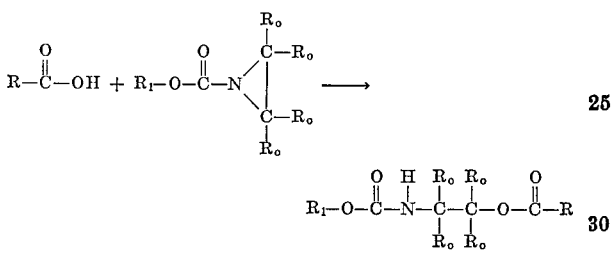

wherein each $R_o$ and R is a hydrogen atom or a lower alkyl group of from 1 to 4 carbon atoms and $R_1$ is an alkyl group of from 1 to 6 carbon atoms. Thus, R and $R_o$ may each be a methyl, ethyl, n-propyl, i-propyl, n-butyl, i-butyl, sec-butyl, t-butyl group and $R_1$ may be a methyl, ethyl propyl, butyl, pentyl or hexyl group.

Typical acid reactants include formic, acetic, propionic, butyric and pentanoic acids which may be reacted with $C_1$-$C_6$ alkyl 1-aziridinylcarboxylates in which the aziridine ring may be substituted with up to four lower alkyl groups. Examples of suitable 1-aziridinylcarboxylates include methyl aziridinylcarboxylate, ethyl 2-n-propyl-1-aziridinylcarboxylate and ethyl 2-methyl-1-aziridinylcarboxylate.

The process of the invention is carried out at temperatures of from about 15° to 200° C. (preferably from about 25° to 160° C.). Mole ratios of alkanoic acid to carboxylate of from about 0.5:1 to 10:1 may be used. It is usually desirable to use an excess of acid because the aziridinylcarboxylates have a tendency to polymerize on heating. A 10 to 20 percent molar excess of acid is sufficient. The process may be carried out at subatmospheric and superatmospheric pressures and is normally carried out at atmospheric pressure under reflux conditions. At higher temperattures (170° to 200° C.), pressures greater than atmospheric pressure may be used effectively. An inert solvent may be used in the reaction mixture but is not necessary to carry out the reaction.

The compounds of the invention are useful as inhibitors for retarding the reaction of a halohydrocarbon (e.g., methyl chloroform, perchloroethene, etc.) with a metal such as aluminum. Concentrations of from about 3 to 15 percent by weight of the carbamate ester in the haloalkane are generally sufficient to slow down or stop the reaction. The compounds are particularly useful as inhibitors for halohydrocarbons which are used as commercial degreasing solvents for metals.

In addition, the compounds are useful in biological applications. For example, solutions or dispersions of ethyl 2-propionyloxyethylcarbamate in concentrations of about 500 parts per million are effective against the plum curculio when contacted with this pest by spraying or other means.

The following examples are submitted for the purpose of illustration only and are not to be construed as limiting the scope of the invention in any way.

*Example I*

To 74 grams (1.0 mole) of propionic acid was added dropwise 30 grams (0.26 mole) of ethyl 1-aziridinylformate (ethyl 1-aziridinylcarboxylate) while stirring under a nitrogen atmosphere. The temperature was maintained at 15°–25° C. during the reaction. The excess acid was neutralized with dilute sodium hydroxide and the mixture was extracted several times with benzene. The benzene solution was washed with water, dried over anhydrous calcium sulfate, filtered and concentrated. Vacuum distillation yielded 28 grams (57 percent of theory) of crude ethyl ester of 2-hydroxyethylcarbamic acid propionate. The product was redistilled and had the following properties: $\eta_D^{27}=1.4375$; boiling point=76°–77° C. at 0.2 mm. of Hg.

Analysis ($C_8H_{15}NO_4$) (ethyl 2-propionyloxyethylcarbamate). Theory: C, 50.78; H, 7.99; N, 7.40. Found: C, 50.50; H, 7.97; N, 7.12.

Infrared spectroscopic analysis was consistent with the formula:

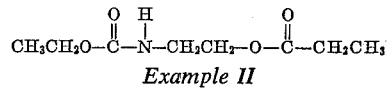

*Example II*

The reaction of Example I was repeated at 140–156° C. using 19.4 grams (0.262 mole) of propionic acid and 30.0 grams (0.26 mole) of ethyl 1-aziridinylcarboxylate. Vapor phase chromatographic analysis of the reaction mixture showed that it contained 96 percent (by weight) of the expected product. Distillation gave a 90 percent yield of:

*Example III*

In a manner similar to Example I, 0.2 mole of ethyl 1-aziridinylcarboxylate was mixed with 12.5 moles of glacial acetic acid at 25° C. This mixture was allowed to stand for 30 minutes after which the excess acid was removed under vacuum and the residue distilled to yield 87 percent of theory of ethyl 2-acetyloxyethylcarbamate having the following properties: $\eta_D^{20}=1.4422$; boiling point=91°–101° C. at 0.1 mm. Hg; density (20° C.)=1.116.

We claim as our invention:
1. A method of preparing carbamate esters having the formula:

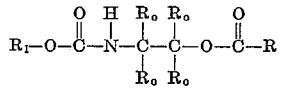

wherein:
(a) each $R_o$ and R is independently selected from the group consisting of the hydrogen atom and a lower alkyl group of from 1 to 4 carbon atoms, and
(b) $R_1$ is an alkyl group of from 1 to 6 carbon atoms
which comprises reacting at a temperature of from 15° to 200° C. a compound of the formula

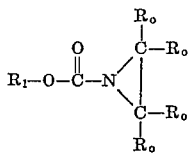

wherein:

(a) $R_0$ is selected from the group consisting of the hydrogen atom and a lower alkyl group of from 1 to 4 carbon atoms, and (b) $R_1$ is an alkyl group of from 1 to 6 carbon atoms with an alkanoic acid of from 1 to 5 carbon atoms, the conversion to carbamate ester taking place in about one-half hour or less.

2. A method according to claim 1 wherein the reaction is carried out at temperatures of from about 25° to 160° C.

3. The process of claim 2 wherein a 10 to 20 percent molar excess of carboxylic acid is used.

4. A process for the manufacture of ethyl 2-propionyloxyethylcarbamate which comprises reacting ethyl 1-aziridinylcarboxylate with propionic acid at a temperature of from 15° to 200° C., the conversion to ethyl 2-propionyloxyethylcarbamate taking place in about one-half hour or less.

5. A process for the manufacture of ethyl 2-acetyloxyethylcarbamate whic comprises reacting ethyl 1-aziridinylcarboxylate with acetic acid at a temperature of from 15° to 200° C., the conversion to ethyl 2-acetyloxyethylcarbamate taking place in about one-half hour or less.

6. A method according to claim 1 wherein the mole ration of carboxylic acid to aziridinyl carboxylate is from about 0.5:1 to 10:1.

References Cited

UNITED STATES PATENTS 2,884,435   4/1959   Tazuma _____ 260—453
2,915,480   12/1959  Reeves et al. _____ 260—482 X

OTHER REFERENCES

Jones et al.: J. Org. Chem., vol. 9, pages 500–512 (1944), copy in Sci. Lib. (QD 241 J6), relied upon page 503.

LORRAINE A. WEINBERGER, *Primary Examiner.*

ALBERT P. HALLUIN, *Assistant Examiner.*